United States Patent [19]

Patil

[11] Patent Number: 5,741,864

[45] Date of Patent: Apr. 21, 1998

[54] FUNCTIONALIZED STYRENE POLYMERS AND COPOLYMERS

[75] Inventor: Abhimanyu Onkar Patil, Westfield, N.J.

[73] Assignee: Exxon Research & Engineering Company, Florham Park, N.J.

[21] Appl. No.: 508,640

[22] Filed: Jul. 28, 1995

[51] Int. Cl.⁶ .................................................. C08F 8/34
[52] U.S. Cl. ............................... 525/333.3; 525/333.5; 525/333.6; 525/343; 525/378; 525/374; 525/384
[58] Field of Search ............................ 525/333.6, 333.3, 525/333.5; 526/310

[56] References Cited

U.S. PATENT DOCUMENTS 4,471,079  9/1984  Enami ................................. 525/328.2

*Primary Examiner*—Bernard Lipman
*Attorney, Agent, or Firm*—Joseph J. Dvorak; Gerard J. Hughes

[57] ABSTRACT

The present invention provides a functionalized styrenic polymer or copolymer which contains functionalized styrene moiety having the formula:

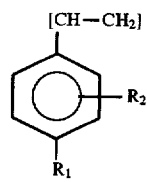

wherein $R_1$ is hydrogen, alkyl, primary and secondary halo alkyl groups, and $R_2$ is:

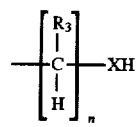

where n is an integer of from 2 to about 10, $R_3$ is independently hydrogen or an alkyl group and X is NH, O or S. The novel copolymers of the present invention have particular utility in forming polymer blends. For example, the amine and alcohol functionalized polymers can be used as compatabilizers by reacting them with a carboxylic acid containing polymer or the like.

6 Claims, No Drawings

FUNCTIONALIZED STYRENE POLYMERS AND COPOLYMERS

FIELD OF THE INVENTION

This invention relates to functionalized copolymers of styrene and an isoolefin.

Background of the Invention

Styrene containing polymers, especially copolymers of para-alkylstyrene and an isoolefin having from about 4 to 7 carbon atoms, are well-known in the art. Indeed, copolymers of para-alkylstyrene and isobutylene are low Tg elastomers which possesses low air permeability, unique damping properties, excellent environmental aging resistance and low surface energy which makes them particularly desirable in many applications. Unfortunately, these polymers also have low reactivity and poor compatibility with most other polymers. Thus there is a need for functionalizing styrenic containing polymers and copolymers, especially copolymers of isoolefins and para-alkylstyrene, with more compatible units for blending.

It is an object of the present invention therefore to functionalize styrene containing polymers with reactive groups which will permit the functionalized polymer to be co-reacted or compatabilized with other polymers by grafting techniques.

SUMMARY OF THE INVENTION

Accordingly, the present invention provides a functionalized styrenic polymer or copolymer which contains functionalized stryene moiety having the formula:

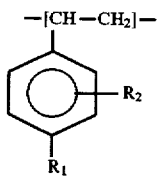

wherein $R_1$ is hydrogen, alkyl, primary or secondary halo alkyl groups, and $R_2$ is

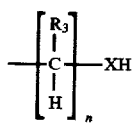

where n is an integer of from 2 to 10, $R_3$ is independently hydrogen or an alkyl group of from 1 to 10 carbon atoms and X is NH, O or S.

The novel copolymers of the present invention have particular utility in forming polymer blends. For example, the amine and alcohol functionalized polymers can be used as compatabilizers by reacting them with a carboxylic acid containing polymer or the like.

Detailed Description of the Invention

Polymers containing styrene units may be functionalized in accordance with the process of the present invention. Particularly suitable styrene containing polymers for functionalization are copolymers of an isoolefin having from about 4 to 7 carbon atoms and a styrene or para-alkylstyrene moiety represented by the formula

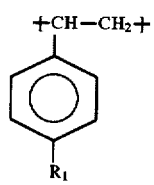

wherein $R_1$, is a hydrogen, alkyl, primary or secondary haloalkyl which alkyl and haloalkyl groups have from about 1 to about 6 carbon atoms. In the practice of the present invention, however, it is particularly preferred to use a copolymer of isobutylene and para-methyl styrene.

The foregoing polymers are functionalized by reacting the styrene containing polymer or copolymer with a compound having the formula

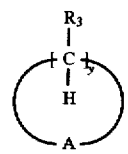

in the presence of a Lewis acid. In the foregoing formula, $R_3$ is independently hydrogen or an alkyl group of from 1 to about 10 carbon atoms. A is NH, O, S and $CO_3$ and y is an integer of from 2 to 10.

In the case when A is NH, $R_3$ preferably is an alkyl group. A specific example of such a compound is methylaziridine. In the case when A is $CO_3$, propylene carbonate is particularly suitable. When A is O, an epoxy, such as epoxybutane is suitable. Finally, ethylene sulfide is useful when A is S.

Any Lewis acid catalyst can be used in preparing the functionalized styrene containing polymers; however, the preferred Lewis acid catalysts are based on metals such as boron, aluminum, gallium, indium, titanium, zirconium, tin, arsenic, antimony and bismuth. Especially preferred are the halide containing compounds of the foregoing metals such as boron trifluoride, aluminum trichloride, aluminum dichloride and the like.

Typically, the functionaliztion will be carried out in the presence of a hydrocarbon diluent such as aliphatic hydrocarbons or in the presence of a polar solvent such as nitrobenzene, methylene chloride, 1, 2 dichloroethane and the like. It is particularly preferred in the practice of the present invention to carry out the process in the presence of a solvent.

The functionalization of the polymers typically is carried out at temperatures of from about $-50°$ C. to about $100°$ C., for times sufficient to add the functional group, i.e., the alkyl amine or alkyl alcohol, to the aromatic ring of the styrene containing polymer.

The ratio of aziridine, alkylene oxide, or alkylene carbonate to the styrenic units in the styrene containing polymer can vary widely. In general, however, from about 0.01 to 10 mols of aziridine, alkylene oxide or alkylene carbonate per 1 mols of styrenic moieties in the styrene containing polymer will be employed.

The following examples illustrate the invention:

EXAMPLE 1

The copolymer of para-methylstyrene and isobutylene utilized in this example contained 7.5 wt. % paramethylstyrene. The copolymer had a Mooney viscosity of 50. 3.00 g of copolymer was dissolved in 30 ml dichloromethane in a three neck flask equipped with condenser, nitrogen bubbler and a dropping funnel. 0.5 g of methylaziridine was added to above solution, followed by 0.22 grams of AlCl$_3$. The mixture was stirred at room temperature for 18 hours. The product was isolated by adding to the solution 100 ml of 50:50 acetone/water mixture. The product was washed with acetone and dried. The product contained 0.17% N and the infrared spectra had an absorption peak at 3396 cm$^{-1}$ characteristic of the amine functionality.

EXAMPLE 2

The copolymer of isobutylene and para-methylstyrene utilized in this example contained 6.0 wt % paramethylstyrene. The copolymer had weight average molecular weight (Mw) of 5400 and a number average molecular weight (Mm) of 2000 with a polydispersity of 2.7.

2.10 g of copolymer was dissolved in a 30 ml of anhydrous dichloromethane in a three neck flask equipped with condenser, nitrogen bubbler and a dropping funnel. 1.0 g of 1,2-epoxybutane was added to above solution, followed by 1.2 grams of AlCl$_3$. The solvent dichloromethane was removed by nitrogen stripping and the product was stirred with 100 ml 1N HCl for 1 hour to dissolve aluminum salt. After decanting the liquid phase, the solid product was then washed with acetone and dried under vaccuum.

The FTIR of the product showed characteristic absorption at 3452 cm$^{-1}$ for hydroxyl group.

What is claimed:

1. A functionalized styrene polymer or copolymer which contains in the polymeric chain monomeric units of the formula:

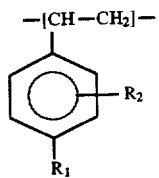

wherein R$_1$ is of alkyl or primary or secondary halo alkyl; R$_2$ is

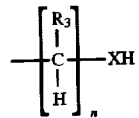

wherein is an integer of from 2 to 10, R$_3$ is hydrogen or an alkyl group, and X is NH, O or S.

2. The functionalized polymer of claim 1 wherein the styrene polymer is a copolymer of styrene and an isoolefin from about 4 to about 7 carbon atoms.

3. The functionalized copolymer of claim 2 wherein the styrene polymer is a copolymer of para-alkylstyrene and an isoolefin having from about 4 to about 7 carbon atoms.

4. The polymer of claim 3 wherein R$_1$ is methyl.

5. The polymer of claim 3 wherein X is NH.

6. The polymer of claim 5 wherein R$_3$ is an alkyl group of from 1 to about 10 carbon atoms.

* * * * *